United States Patent [19]

Bex et al.

[11] 4,294,139

[45] Oct. 13, 1981

[54] DRIVE FOR A MACHINE COMPRISING VARIABLE-STROKE RECIPROCATING PISTONS

[75] Inventors: Peter T. J. Bex; George A. A. Asselman, both of Eindhoven, Netherlands

[73] Assignee: U.S. Philips Corporation, New York, N.Y.

[21] Appl. No.: 99,182

[22] Filed: Nov. 30, 1979

[30] Foreign Application Priority Data

Jan. 5, 1979 [NL] Netherlands ......................... 7900076

[51] Int. Cl.³ ....................... F16H 35/08; F01B 13/04
[52] U.S. Cl. .......................................... 74/839; 74/60;
91/506; 92/12.2; 123/58 B
[58] Field of Search ................... 74/60, 839; 92/12.2;
91/505, 506; 123/48 R, 48 B, 58 B, 58 BA, 78 R, 78 BA, 78 E, 78 F; 417/222, 269

[56] References Cited

U.S. PATENT DOCUMENTS

| | | | |
|---|---|---|---|
| 1,112,832 | 10/1914 | Pierce | 123/78 F |
| 2,379,546 | 7/1945 | Snader et al. | 91/506 X |
| 3,010,403 | 11/1961 | Zubaty | 92/12.2 X |
| 3,170,450 | 2/1965 | Kent et al. | 92/12.2 X |
| 3,376,822 | 4/1968 | Leduc et al. | 92/12.2 |
| 3,873,240 | 3/1975 | Leduc et al. | 417/222 |
| 4,077,269 | 3/1978 | Hodgkinson | 92/12.2 |
| 4,174,684 | 11/1979 | Roseby et al. | 123/48 B |

FOREIGN PATENT DOCUMENTS

| | | | |
|---|---|---|---|
| 1168773 | 10/1969 | United Kingdom | 91/506 |
| 1335666 | 10/1973 | United Kingdom | 91/506 |

*Primary Examiner*—Lawrence J. Staab
*Attorney, Agent, or Firm*—Marc D. Schechter

[57] ABSTRACT

A drive comprising a rotatably journalled shaft on which a plate is mounted so that the plate cannot rotate with respect to the shaft during operation. The plate can, however, be adjusted around a pin which extends transverse to the rotatably journalled shaft, so that the angle enclosed by the plate and the shaft can be varied. The pin is journalled in a bearing block which is adjustable in the shaft direction. Each of the pistons has a piston rod with a piston rod head whose side which faces the plate is provided with a spherical surface which cooperates with a sliding body which bears against the contact surface of the plate. The side of the plate which is remote from the piston rod comprises a spherical cam which has the same center of curvature as the spherical surface of the drive rod head. The cam is supported by a surface which forms part of a structural member which is rigidly coupled to the shaft.

6 Claims, 1 Drawing Figure

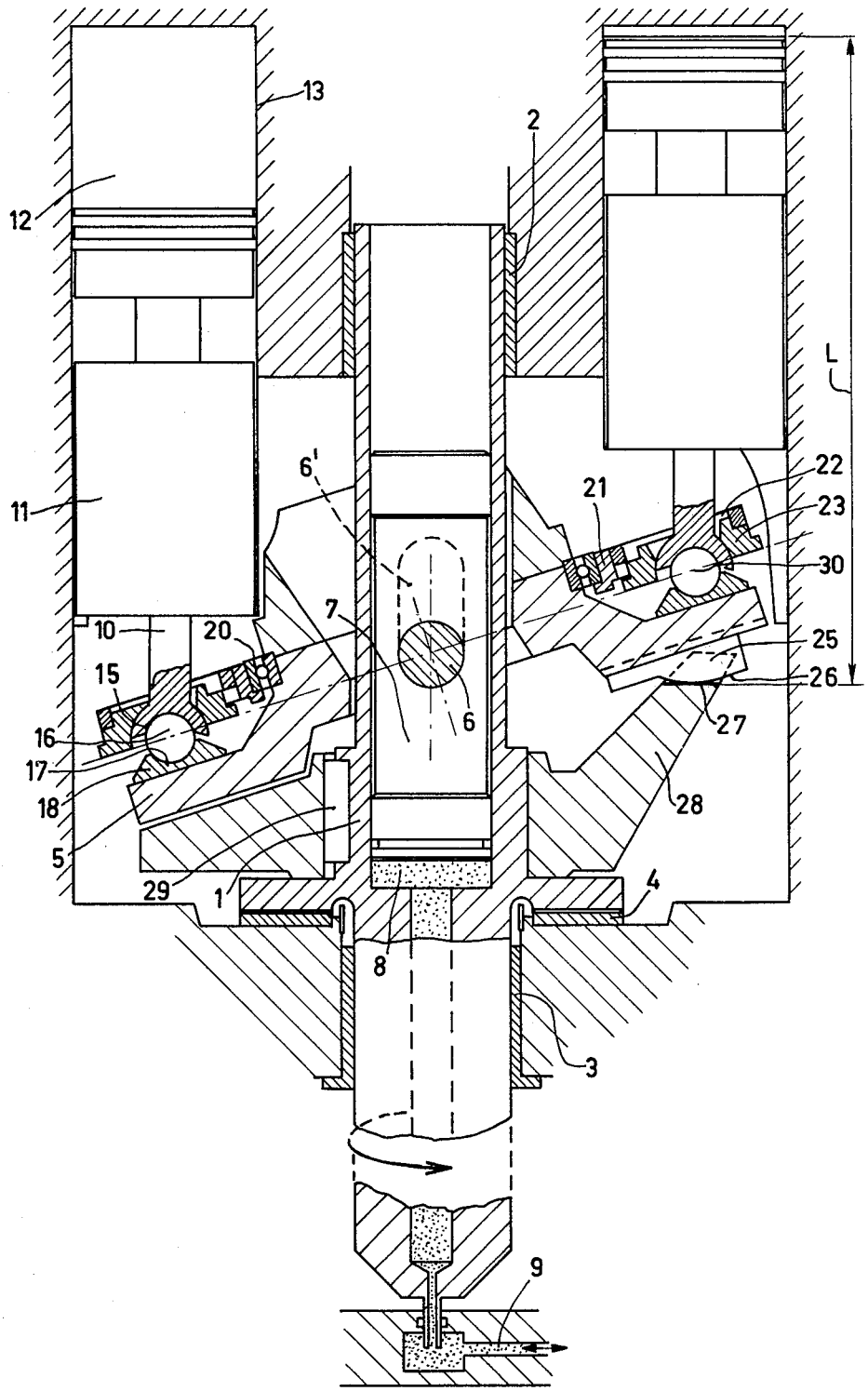

DRIVE FOR A MACHINE COMPRISING VARIABLE-STROKE RECIPROCATING PISTONS

BACKGROUND OF THE INVENTION

The invention relates to a drive for a machine having variable-stroke reciprocating pistons; and more particularly to such a machine having a rotatably journalled shaft having an axis on which a plate is mounted so that the plate cannot rotate around the axis of the shaft during operation but. The plate can, however, be adjusted around a pin which extends transverse to the rotatably journalled shaft, so that the angle enclosed by the plate and the shaft varies. The pin is journalled in a bearing block which is adjustable in the shaft direction. Each of the pistons in the machine has a drive rod having a drive rod head. The side of the drive rod head which faces the plate has a spherical surface which cooperates with a spherical surface of a further structural member. This further structural member is itself constructed as, or cooperates with, a sliding body which bears against the contact surface of the plate.

A drive of the kind which forms the subject of the present invention is known from U.S. Pat. No. 4,077,269. In this known drive the position of the plate with respect to the shaft is varied by displacement of the bearing block in the shaft direction by means of a screw and a nut which are connected to the pin. Because the plate is guided in a guide by way of an arm and a sliding block which is pivotably connected thereto, the plate will be tilted when the pin is displaced in the shaft direction. The guiding path then determines the tilt of the plate, so that it is not only possible to vary the length of the stroke of the pistons, but also the compression ratio.

The complex shape of and the large forces occurring between the sliding block and the guide are drawbacks of this known drive.

A further drawback is that adjustment of the plate not only causes a variation of the length of the piston stroke, but also of the top dead center of the pistons. Thus, more detrimental volume is introduced.

SUMMARY OF THE INVENTION

An object of invention is to provide a drive of the described kind in which the tilt of the plate is adjustable, but in which the top dead center is the same for all tilt angles of the plate.

In order to realize this object, the drive according to the invention is characterized in that the side of the plate which is remote from the piston rods comprises a spherical cam which has a center of curvature which, when a drive rod is situated opposite this cam, coincides with the center of curvature of the spherical surface of this drive rod head. The cam is supported by a surface which forms part of a structural member which is rigidly coupled to the shaft.

By means of this comparatively simple construction, when the pin is displaced, the plate performs a rotation around the center of the spherical surface of the drive rod head, so that the position of the top dead center of the piston stroke remains constant. Thus, a detrimental increase in volume is avoided when the position of the plate is varied.

In a further embodiment of the drive according to the invention, the adjustable bearing block is constructed as a piston which is movable inside the hollow rotatably journalled shaft and which is supported by a controllable liquid column.

BRIEF DESCRIPTION OF THE DRAWINGS

The invention will be described in detail hereinafter with reference to the drawing which shows, by way of example, a sectional view of a drive according to the invention.

DESCRIPTION OF THE PREFERRED EMBODIMENTS

The reference numeral 1 in the FIGURE denotes a hollow shaft, having an axis, which is rotatably journalled at the areas 2 and 3. The shaft is further supported by a thrust bearing 4 for taking up the axial forces.

Around the shaft there is provided a plate 5 which has a hole in its center. A pin 6, and an axis thereof extend diametrically in the hole and are passed through two slot-like recesses 6' in the shaft 1. The pin is journalled in a piston 7 which is movable inside the hollow shaft 1. The piston 7 is supported by a liquid column in the space 8, the level of which can be controlled by supplying or discharging oil via a duct 9.

The plate 5 cooperates with a number of piston rods 10 which are connected, via guide sleeves 11, to associated pistons 12 which are accommodated in cylinders 13. The sides of heads of the piston rods 10 which face the plate 5 comprise spherical surfaces 15 which cooperate with balls 16 which bear against spherical cavities 17 of sliding bodies 18. Sliding bodies 18 bear against the contact surface of the plate 5.

On the plate 5 there is journalled a plate 21, via a ball bearing 20. The plate 21 comprises apertures 22 which are situated around the piston rods 10 and whose edges resiliently press on cups 23 around the piston rod heads. It is thus ensured that the piston rods are always positively pressed against the plate 5.

The lower side of the plate 5 is provided with a cam 25 which has a spherical surface 26 which has the same center of curvature 30 as the spherical surface 15 of the drive rod 10 situated opposite the cam. The spherical surface 26 of the cam 25 bears against a surface 27 of a structural member 28 which is rigidly connected to the shaft 1 by way of a key 29. Generally, the surface 26 of cam 25 may have a cross section which is at last a portion of a circle with an axis which is parallel to the axis of pin 6 and which passes through the center of curvature 30 of spherical surface 15.

The piston 7 is moved upwards by supplying liquid to the space 8 via the duct 9. The pin 6 is then also moved upwards while sliding through the slots 6' in the shaft 1. As a result of this movement, the plate 5 pivots and assumes a more horizontal position, its cam 25 rolling over the surface 27. Due to the spherical construction of the cam 25, the plate is tilted around the common center of curvature 30 of the spherical surface 26 as well as of the spherical surface 15 of the piston rod head. This means that when the position of the plate 5 is varied, the distance L between the surface 27 and the top dead center of the piston is not varied.

Even though the coupling between the piston rod head and the sliding body is constructed to comprise a loose ball 16 in the Figure, it is alternatively possible to construct the drive rod head itself to be spherical and to make it cooperate directly with a cavity in the sliding body. Any other means for slideably coupling a spherical surface of the piston rod head to the plate may also be used.

What is claimed is:

1. A drive for a machine having variable-stroke reciprocating pistons, comprising:
   a shaft having an axis, said shaft being rotatably journalled in the machine;
   a plate, mounted on the shaft so that the plate cannot rotate with respect to the shaft around the shaft axis, said plate being mounted on the shaft so that the angle between the plate and the shaft axis can be varied and so that the plate is movable along the direction of the shaft axis;
   at least one piston comprising a piston rod having a piston rod head, said piston rod head having a side which faces the plate comprising a spherical surface; and
   means for slideably coupling the spherical surface of the piston rod head to the plate;
   CHARACTERIZED IN THAT
   the plate has a side which is remote from the piston rod, said side comprising a spherical cam which has a center of curvature which, when the piston rod is situated opposite the cam, coincides with the center of curvature of the spherical surface of the piston rod head; and
   the drive further comprises a structural member, rigidly coupled to the shaft, for supporting the cam.

2. A drive as claimed in claim 1, CHARACTERIZED IN THAT the shaft has slots, the drive further comprising:
   a pin, having an axis extending transverse to the shaft axis, passing through the slots in the shaft, said plate being pivotable around the axis of the pin so that the angle between the plate and the shaft can be varied, said pin being movable along the direction of the shaft axis.

3. A drive as claimed in claim 2, CHARACTERIZED IN THAT the means for slidably coupling the spherical surface of the piston rod head to the plate comprise:
   a sliding body which bears against a contact surface of the plate, said sliding body having a spherical cavity therein; and
   a ball, engaged between the spherical surface of the piston rod head and the spherical cavity in the sliding body.

4. A drive as claimed in claim 2, CHARACTERIZED IN THAT the means for slidably coupling the spherical surface of the piston rod head to the plate comprise:
   a sliding body which bears against a contact surface of the plate, said sliding body having a spherical cavity therein, said spherical surface of the piston rod engaging said spherical cavity.

5. A drive as claimed in claim 3 or 4, CHARACTERIZED IN THAT:
   the shaft is hollow;
   the drive further comprises a piston movable inside the hollow shaft, said pin being journalled in the piston; and means for hydraulically controlling the position of the piston along the axis of the shaft.

6. A drive for a machine having variable-stroke reciprocating pistons, comprising:
   a shaft having an axis, said shaft being rotatably journalled in the machine;
   a plate, mounted on the shaft so that the plate cannot rotate with respect to the shaft around the shaft axis, said plate being mounted on the shaft so that the angle between the plate and the shaft axis can be varied, by pivoting the plate around a plate axis, and so that the plate is movable along the direction of the shaft axis;
   at least one piston comprising a piston rod having a piston rod head, said piston rod head having a side which faces the plate comprising a spherical surface; and
   means for slideably coupling the splerical surface of the piston rod head to the plate;
   CHARACTERIZED IN THAT
   the plate has a side which is remote from the piston rod, said side comprising a cam having a cam surface;
   the drive further comprises a structural member, rigidly coupled to the shaft, for supporting the cam via the cam surface;
   said cam has a cross section which passes through said cam surface and which is substantially at least a portion of a circle having an axis which is parallel to the plate axis, the axis of said circle passing through the center of curvature of said spherical surface of the piston rod head when the piston rod is situated opposite the cam.

* * * * *

UNITED STATES PATENT AND TRADEMARK OFFICE
CERTIFICATE OF CORRECTION

PATENT NO. : 4,294,139
DATED : October 13, 1981
INVENTOR(S) : PETER T.J. BEX ET AL It is certified that error appears in the above—identified patent and that said Letters Patent is hereby corrected as shown below:

Column 2, Line 47, change "last" to --least--;

Claim 8, Line 24 (column 4, line 42), after "surface;" insert --and--.

Signed and Sealed this

Twenty-seventh Day of April 1982

[SEAL]

Attest:

GERALD J. MOSSINGHOFF

Attesting Officer     Commissioner of Patents and Trademarks